(12) United States Patent
Yasukawa et al.

(10) Patent No.: US 11,201,861 B2
(45) Date of Patent: Dec. 14, 2021

(54) SERVER FOR PROVIDING A TOKEN

(71) Applicant: SORACOM, INC, Tokyo (JP)

(72) Inventors: Kenta Yasukawa, Tokyo (JP); Motokatsu Matsui, Tokyo (JP); Yuta Shimizu, Tokyo (JP); Takashi Oguma, Tokyo (JP)

(73) Assignee: SORACOM, INC, Tokyo (JP)

( * ) Notice: Subject to any disclaimer, the term of this patent is extended or adjusted under 35 U.S.C. 154(b) by 236 days.

(21) Appl. No.: 16/040,907

(22) Filed: Jul. 20, 2018

(65) Prior Publication Data

US 2018/0351943 A1 Dec. 6, 2018

Related U.S. Application Data

(63) Continuation of application No. PCT/JP2016/052175, filed on Jan. 26, 2016.

(51) Int. Cl.
*G06F 21/33* (2013.01)
*H04L 9/32* (2006.01)
(Continued)

(52) U.S. Cl.
CPC .......... *H04L 63/0807* (2013.01); *G06F 21/33* (2013.01); *H04L 9/32* (2013.01); *H04L 63/0823* (2013.01); *H04L 63/0884* (2013.01); *H04L 63/102* (2013.01); *H04M 11/00* (2013.01); *H04W 8/20* (2013.01); *H04W 12/069* (2021.01); *H04W 12/04* (2013.01)

(58) Field of Classification Search
CPC ............. H04L 63/0823; H04L 63/0807; H04L 63/0884; H04L 63/102; H04L 9/32; G06F 21/33; H04M 11/00; H04W 8/20; H04W 12/06; H04W 12/069; H04W 12/04
USPC ......................................................... 713/156
See application file for complete search history.

(56) References Cited

U.S. PATENT DOCUMENTS 7,715,822 B2   5/2010   Semple et al.
7,966,000 B2   6/2011   Semple et al.
(Continued)

FOREIGN PATENT DOCUMENTS

CN   101147377 B   3/2013
CN   105072108 B   10/2018
(Continued)

OTHER PUBLICATIONS

International Search Report for PCT/JP2016/052175 dated May 17, 2016 (partially translated).
(Continued)

*Primary Examiner* — Farid Homayounmehr
*Assistant Examiner* — Thanh T Le
(74) *Attorney, Agent, or Firm* — Thomas | Horstemeyer, LLP

(57) ABSTRACT

A server for providing a token to a mobile terminal includes a network interface and a processing unit coupled to the network interface. The processing unit is configured to receive from the mobile terminal a request asking for the token, to obtain subscriber identification information of the mobile terminal, to obtain a token which includes a user profile associated with the subscriber identification information and to which an electronic signature is added, and to transmit the token to the mobile terminal.

8 Claims, 9 Drawing Sheets

(51) Int. Cl.
*H04M 11/00* (2006.01)
*H04W 12/069* (2021.01)
*H04W 12/04* (2021.01)
*H04W 8/20* (2009.01)
*H04L 29/06* (2006.01)

(56) References Cited

U.S. PATENT DOCUMENTS

| | | | | |
|---|---|---|---|---|
| 8,301,141 | B1* | 10/2012 | Reeves | H04W 4/16 455/435.1 |
| 8,391,841 | B2 | 3/2013 | Semple et al. | |
| 8,863,256 | B1* | 10/2014 | Addepalli | B60R 16/023 726/7 |
| 9,270,761 | B1* | 2/2016 | Logue | H04L 67/141 |
| 2006/0205388 | A1 | 9/2006 | Semple et al. | |
| 2006/0235796 | A1* | 10/2006 | Johnson | G06Q 20/02 705/44 |
| 2010/0024014 | A1* | 1/2010 | Kailash | H04L 9/3213 726/6 |
| 2010/0174907 | A1 | 7/2010 | Semple et al. | |
| 2011/0078773 | A1* | 3/2011 | Bhasin | H04W 12/068 726/5 |
| 2011/0173105 | A1 | 7/2011 | Schirilla et al. | |
| 2011/0238972 | A1 | 9/2011 | Semple et al. | |
| 2012/0115442 | A1* | 5/2012 | Dadu | H04L 63/123 455/411 |
| 2012/0184242 | A1* | 7/2012 | Li | H04W 12/06 455/406 |
| 2013/0019295 | A1 | 1/2013 | Park et al. | |
| 2013/0067552 | A1* | 3/2013 | Hawkes | H04L 63/0869 726/7 |
| 2013/0139221 | A1* | 5/2013 | Gundavelli | H04W 12/068 726/4 |
| 2013/0150000 | A1* | 6/2013 | Wong | H04W 12/069 455/411 |
| 2013/0262392 | A1* | 10/2013 | Vibhor | G06F 16/25 707/654 |
| 2015/0058962 | A1* | 2/2015 | Mottes | H04L 63/10 726/9 |
| 2015/0222604 | A1* | 8/2015 | Ylonen | H04L 9/083 713/171 |
| 2015/0256515 | A1* | 9/2015 | Jeong | H04L 63/0421 726/4 |
| 2015/0281362 | A1* | 10/2015 | Shanmugam | H04L 67/12 709/217 |
| 2015/0312038 | A1* | 10/2015 | Palanisamy | G06F 21/44 713/155 |
| 2015/0327065 | A1* | 11/2015 | Mildh | H04W 48/02 455/411 |
| 2015/0334566 | A1* | 11/2015 | Selander | H04W 4/14 455/411 |
| 2016/0055322 | A1* | 2/2016 | Thomas | H04L 63/0876 726/7 |
| 2016/0072800 | A1* | 3/2016 | Soon-Shiong | G16B 50/00 726/7 |
| 2016/0094530 | A1* | 3/2016 | Mihaylov | H04L 63/10 726/7 |
| 2016/0102878 | A1* | 4/2016 | Smith | H04W 12/04 700/276 |
| 2016/0205550 | A1* | 7/2016 | Rajadurai | H04W 12/06 455/411 |
| 2016/0285633 | A1* | 9/2016 | Allinson | G06F 21/34 |
| 2016/0295408 | A1* | 10/2016 | Chen | H04W 4/90 |
| 2017/0325141 | A1* | 11/2017 | Laliberte | H04L 67/00 |
| 2017/0332312 | A1* | 11/2017 | Jung | H04L 12/1407 |
| 2018/0007024 | A1* | 1/2018 | Ahmed | H04L 63/0807 |
| 2018/0020072 | A1* | 1/2018 | Masuda | H04L 45/22 |
| 2018/0159940 | A1* | 6/2018 | Hultkrantz | H04L 67/141 |
| 2020/0410483 | A1* | 12/2020 | Dill | H04L 9/32 |

FOREIGN PATENT DOCUMENTS

| | | |
|---|---|---|
| EP | 2961212 A1 | 12/2015 |
| JP | 2014-013566 | 1/2014 |
| JP | 2014-060784 | 4/2014 |
| JP | 2015-019379 | 1/2015 |
| JP | 2015-026391 | 2/2015 |
| JP | 2015-104047 | 6/2015 |
| WO | 2006084183 A1 | 8/2006 |

OTHER PUBLICATIONS

European Search Report issued for European Patent Application No. 16887879.1 dated Dec. 3, 2018.
Chinese Office Action issued for Chinese Patent Application No. 201680079732.1 dated Aug. 4, 2020.

* cited by examiner

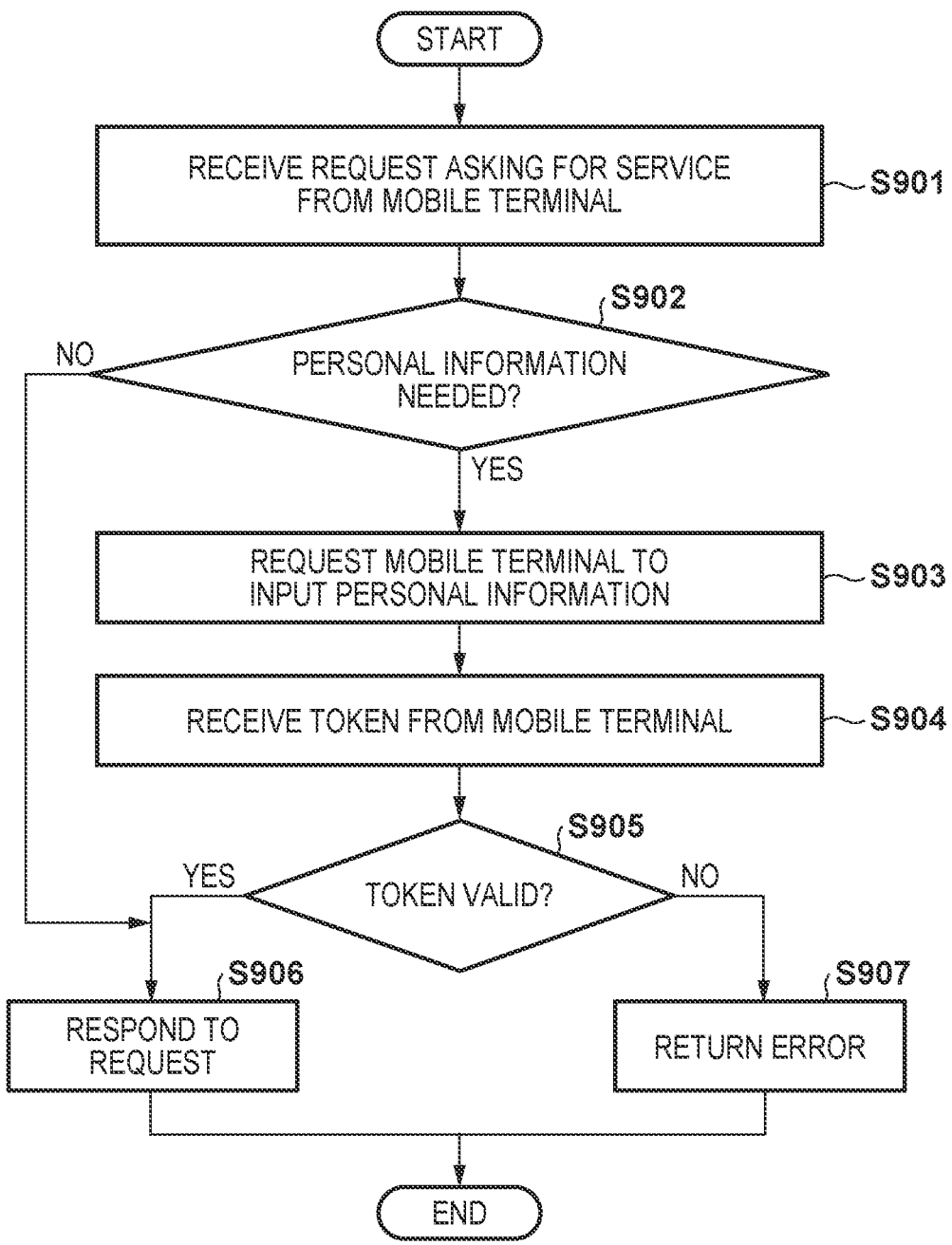

SERVER FOR PROVIDING A TOKEN

This application is a continuation of International Patent Application No. PCT/JP2016/052175 filed on Jan. 26, 2016, the entire content of which is incorporated herein by reference.

TECHNICAL FIELD

The present invention relates to a server for providing a token.

BACKGROUND ART

In recent years, user authentication may be needed when a user uses a service. In an example of user authentication, the user transmits a token to a server as a providing destination of the service via a mobile terminal and the validity of the token is determined on a server side. As a method of providing this token, a method of using dedicated hardware such as an IC chip or a USB key, or a method of using software installed on the mobile terminal is known.

SUMMARY OF INVENTION

In a method of providing a token by dedicated hardware, authentication cannot be performed if this hardware is lost. On the other hand, in a method of providing the token by software, the software needs to be installed on a mobile terminal. In either method, convenience for a user of the mobile terminal is low. Some embodiments of the present invention provide a token assignment scheme which is highly convenient for the user.

According to an aspect of the present invention, there is provided a server arranged in a mobile network for providing a token to a mobile terminal, the server comprising a network interface and a processing unit coupled to the network interface, wherein the processing unit is configured to receive, from the mobile terminal, a request asking for the token, to determine whether the request is received via the mobile network, if the request is received via the mobile network to obtain subscriber identification information of the mobile terminal based on a session with the mobile terminal, to obtain a token which includes a user profile associated with the subscriber identification information and to which an electronic signature is added, and to transmit the token to the mobile terminal, and if the request is received via a network other than the mobile network, to notify the mobile terminal that the token is not transmitted.

Other features and advantages of the present invention will be apparent from the following descriptions taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 9 is a flowchart for explaining an example of another operation of the external server in FIG. 1.

DESCRIPTION OF EMBODIMENTS

Figure 1:
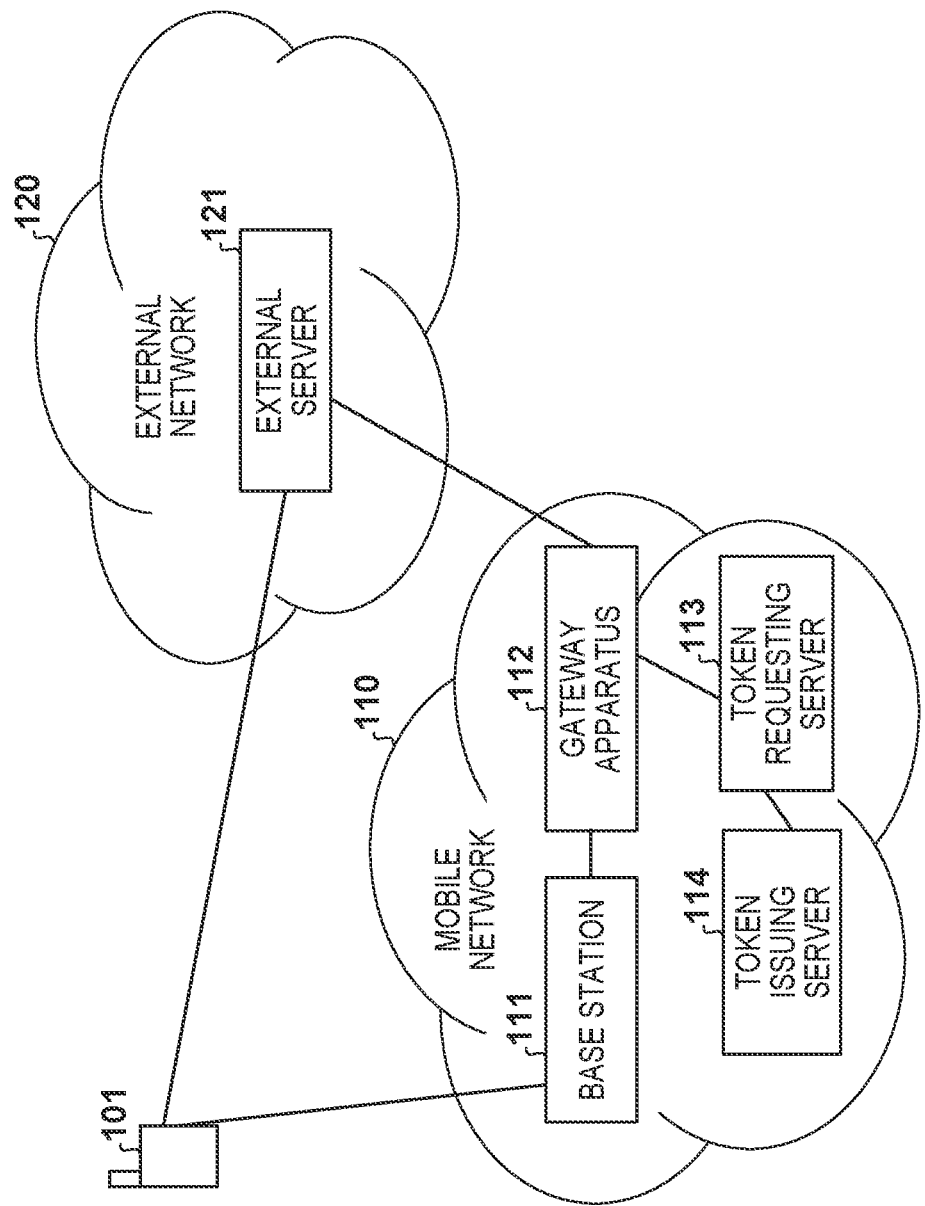
FIG. 1 is a view for explaining an example of the arrangement of a mobile communication system according to some embodiments.

The arrangement of a mobile communication system according to some embodiments of the present invention will be described with reference to FIG. 1. The mobile communication system of FIG. 1 may comply with LTE (Long Term Evolution), 3G, or any other standard. The mobile communication system forms a mobile network 110. The mobile network 110 particularly includes a base station 111, a gateway apparatus 112, a token requesting server 113, and a token issuing server 114. The mobile communication system may be provided by an MNO (Mobile Network Operator) or the MNO and an MVNO (Mobile Virtual Network Operator) in cooperation with each other.

The mobile communication system provides a communication service to a mobile terminal 101. The mobile terminal 101 can access, for example, an external server 121 included in an external network 120 via the mobile network 110. The external network 120 may be a public network such as the Internet, or a private network provided by each individual enterprise or the like. The base station 111 connects the mobile terminal 101 to a core network in the mobile network 110. The gateway apparatus 112 functions as a gateway of the core network and has a function of providing access to the external network 120 to the mobile terminal 101. The gateway apparatus 112 corresponds to a GGSN (packet gateway node) when the mobile network 110 is a 3G network and corresponds to a P-GW (packet data network gateway) when the mobile network 110 is an LTE network. The external server 121 provides various services such as a web browsing service to the mobile terminal 101. Some or all the services provided by the external server 121 may need authentication of the user of the mobile terminal 101 or may request personal information from the user of the mobile terminal 101.

In accordance with a request from the mobile terminal 101, the token requesting server 113 requests the token issuing server 114 to generate a token. The token is information used for authentication in the external server 121 and is also referred to as an authentication token or a security token. The token may be, for example, a JSON Web Token defined by RFC7519. In accordance with the request from the token requesting server 113, the token issuing server 114 generates a token with an electronic signature. The token issuing server 114 is included in, for example, a segment at a backend where communication can be performed safely from the token requesting server 113. The operations of the token requesting server 113 and token issuing server 114 will be described in detail later.

Figure 2:
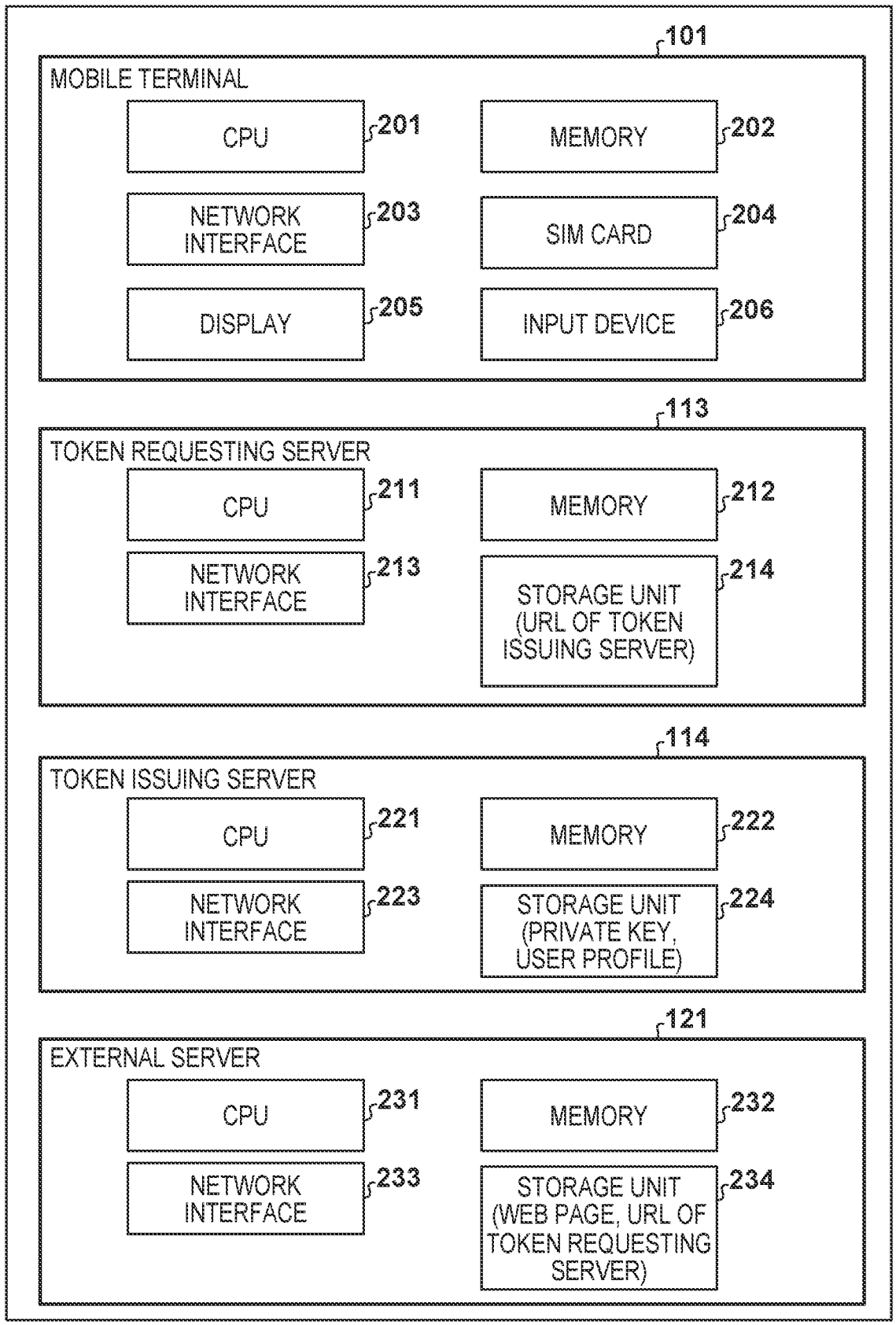
FIG. 2 is a block diagram for explaining examples of the arrangements of some apparatuses in FIG. 1.

Examples of the arrangements of the mobile terminal 101, token requesting server 113, token issuing server 114, and external server 121 will be described with reference to FIG. 2. Each of the base station 111 and the gateway apparatus 112 may have an existing arrangement, and thus the detailed description thereof will be omitted.

The mobile terminal 101 is a device capable of accessing the mobile network 110 and can be, for example, a mobile phone, a smartphone, a tablet, a personal computer, a sensor, an actuator, or the like. The mobile terminal 101 may be an apparatus assumed to be carried or an apparatus assumed to be used fixedly. The mobile terminal 101 includes, for example, a CPU 201, a memory 202, a network interface 203, a SIM card 204, a display 205, and an input device 206. The CPU 201 is coupled to the respective constituent elements of the mobile terminal 101 and controls their operations. The memory 202 stores a program for controlling the operation of the mobile terminal 101 or is used as a work area at the time of the operation.

The network interface 203 is used for the mobile terminal 101 to communicate with another apparatus. The network interface 203 can access the mobile network 110 of, for example, LTE, 3G, or the like. The network interface 203 may further be able to access a network other than the mobile network 110 such as a wireless LAN.

The SIM card 204 is used to authenticate a mobile network operator when the mobile terminal 101 accesses the mobile network 110. The SIM card 204 includes an IC chip that stores an IMSI (International Mobile Subscriber Identity) and private information for authentication. The IMSI is an example of subscriber identification information uniquely assigned to a subscriber for each subscription contract. The SIM card 204 has a high tamper resistance, making it impossible to externally obtain the contents of the SIM card 204. Moreover, the IMSI is issued for each operator who operates the mobile network 110 and is not enabled unless it is registered in the mobile network 110, making it substantially impossible to forge the IMSI.

An IMEI (International Mobile Equipment Identifier) is assigned to the mobile terminal 101. The IMEI is an international identifier assigned to each mobile terminal. The IMEI may be stored in the memory 202 or the network interface 203.

The display 205 is a device for presenting information to the user of the mobile terminal 101. The input device 206 is a device for receiving an input from the user of the mobile terminal 101 and formed by, for example, a keypad or a touch panel. When the mobile terminal 101 is the sensor, the actuator, or the like, the mobile terminal 101 may include neither the display 205 nor the input device 206.

The token requesting server 113 includes, for example, a CPU 211, a memory 212, a network interface 213, and a storage unit 214. The CPU 211 is coupled to the respective constituent elements of the token requesting server 113 and controls their operations. The memory 212 stores a program for controlling the operation of the token requesting server 113 or is used as a work area at the time of the operation. The network interface 213 is used for the token requesting server 113 to communicate with another apparatus. The storage unit 214 stores various kinds of information used for the operation of the token requesting server 113.

The token issuing server 114 includes, for example, a CPU 221, a memory 222, a network interface 223, and a storage unit 224. The CPU 221 is coupled to the respective constituent elements of the token issuing server 114 and controls their operations. The memory 222 stores a program for controlling the operation of the token issuing server 114 or is used as a work area at the time of the operation. The network interface 223 is used for the token issuing server 114 to communicate with another apparatus. The storage unit 224 stores various kinds of information used for the operation of the token issuing server 114.

The external server 121 includes, for example, a CPU 231, a memory 232, a network interface 233, and a storage unit 234. The CPU 231 is coupled to the respective constituent elements of the external server 121 and controls their operations. The memory 232 stores a program for controlling the operation of the external server 121 or is used as a work area at the time of the operation. The network interface 233 is used for the external server 121 to communicate with another apparatus. The storage unit 234 stores various kinds of information used for the operation of the external server 121. For example, information needed to provide a service such as a web page is stored in the storage unit 234.

Figure 3:
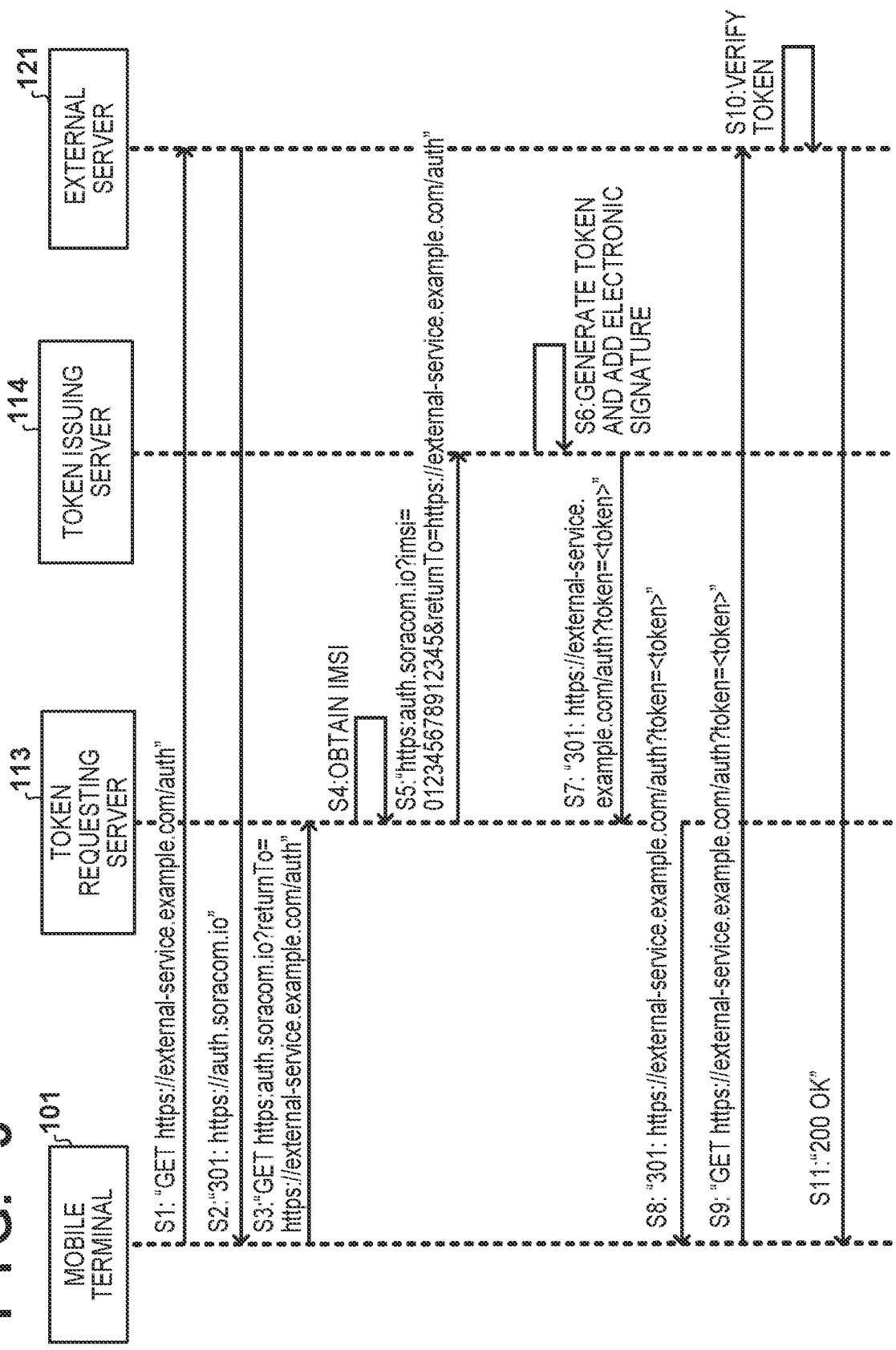
FIG. 3 is a sequence chart for explaining an example of the operation of the mobile communication system in FIG. 1.
Figure 4:
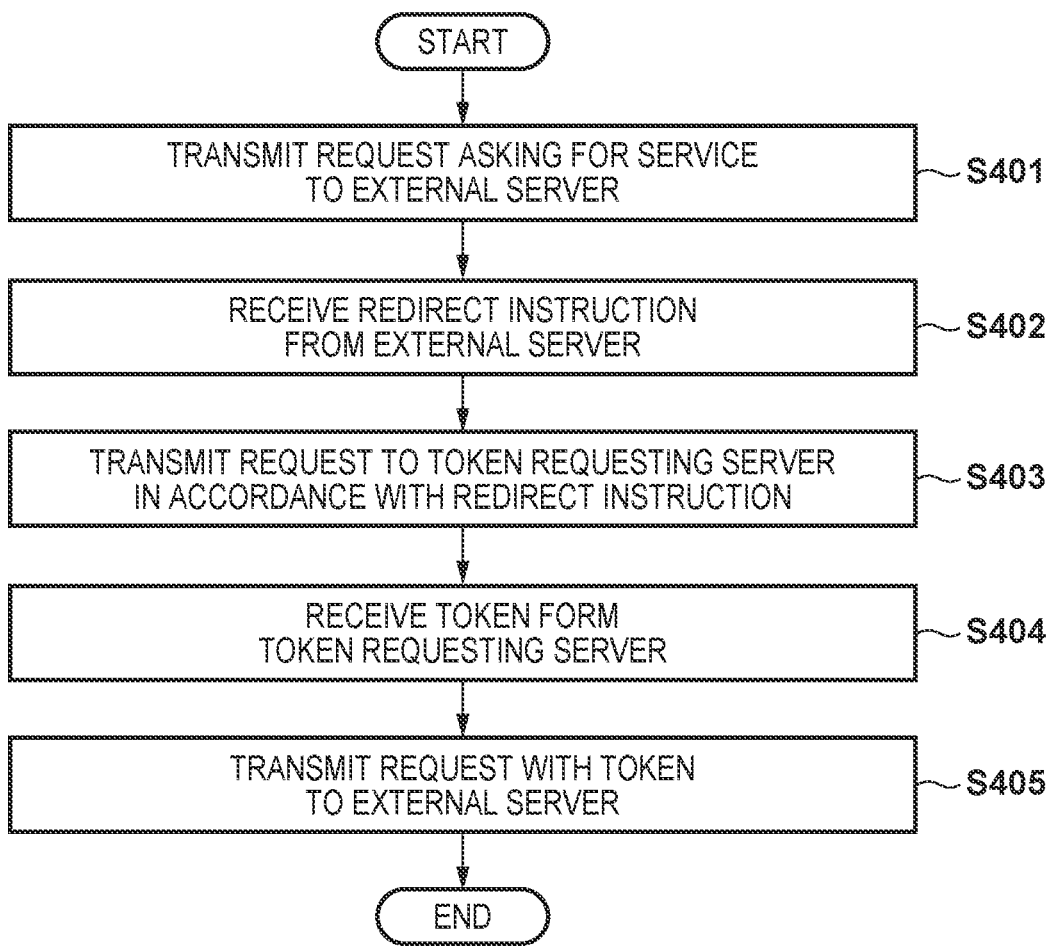
FIG. 4 is a flowchart for explaining an example of the operation of a mobile terminal in FIG. 1.

Subsequently, one scenario of the operation of the mobile communication system in FIG. 1 will be described with reference to FIG. 3. In this scenario, the mobile terminal 101 accesses a web page provided by the external server 121 by an HTTPS via the mobile network 110. This web page needs authentication by the user of the mobile terminal 101. In each step of FIG. 3, a character string enclosed in double quotes indicates an HTTP command for executing each step.

In step S1, the mobile terminal 101 transmits, to the external server 121, a request for browsing the web page that needs authentication. In step S2, the external server 121 redirects the request from the mobile terminal 101 to the token requesting server 113. In step S3, in accordance with a redirect instruction from the external server 121, the mobile terminal 101 transmits a request to the token requesting server 113. This request includes a URL to be returned after obtaining a token (that is, the URL of the web page of a connection destination in step S1).

In step S4, the token requesting server 113 determines that the mobile terminal 101 has transmitted a request via the mobile network 110 and obtains the IMSI of the mobile terminal 101. In step S5, the token requesting server 113 transmits, to the token issuing server 114, a request asking for issuance of a token. This request includes the IMSI of the mobile terminal 101 and a URL to be returned after obtaining the token.

In step S6, the token issuing server 114 generates a token and adds an electronic signature to the token. In step S7, the token issuing server 114 returns the token with the electronic signature to the token requesting server 113. In step S8, the token requesting server 113 transfers the token with the electronic signature to the mobile terminal 101.

In step S9, the mobile terminal 101 transmits, to the external server 121, a request including the received token with the electronic signature as an argument of a parameter. In step S10, the external server 121 verifies the received token with the electronic signature. Here, the token with the electronic signature is valid. Therefore, in step S11, in accordance with the request from the mobile terminal 101, the external server 121 returns the web page that needs authentication to the mobile terminal 101.

Subsequently, the details of the operations of the respective apparatuses in FIG. 3 will be described with reference to FIGS. 4 to 7. First, the operation of the mobile terminal 101 will be described in detail with reference to FIG. 4. This operation may be implemented by causing the CPU 201 of the mobile terminal 101 to execute programs stored in the memory 202 as a general-purpose processing circuit. Instead of this, the mobile terminal 101 may include a dedicated processing circuit (for example, an ASIC) for executing each step below, and this circuit may execute each step.

In step S401, the mobile terminal 101 transmits a request asking for a service to the external server 121. This service may or may not need authentication. This service may be webpage browsing as in the above-described scenario, or a service using a protocol other than the HTTP, for example, transmission/reception of an e-mail, file transfer, or the like. If the service of the external server 121 does not need authentication, the mobile terminal 101 is provided with the service from the external server 121 and terminates the process. A case in which the service of the external server 121 needs authentication will be discussed below.

In step S402, the mobile terminal 101 receives a redirect instruction from the external server 121 as a response to the request transmitted in step S401. This redirect instruction includes the address (for example, the URL) of the token requesting server 113.

In step S403, in accordance with the redirect instruction received in step S402, the mobile terminal 101 transmits a request to the token requesting server 113. As in the above-described scenario, the token requesting server 113 returns a token with an electronic signature to the mobile terminal 101 in accordance with a request from the mobile terminal 101. Hence, the request to the token requesting server 113 is treated as a request asking for the token with the electronic signature regardless of the presence/absence of an explicit instruction in this request. The request to the token requesting server 113 includes a destination address (for example, the URL) of the request transmitted in step S401. The request to the token requesting server 113 may also include information (session information, information that assists user specification, or the like) needed for the external server 121 to continue the subsequent steps, if necessary. For example, the request to the token requesting server 113 may include a query parameter if the request transmitted in step S401 is a GET method or may include user data (that is, arbitrary data to be added freely by the user of the mobile terminal 101) in a Body if the request is a POST method.

In step S404, the mobile terminal 101 receives, from the token requesting server 113, the token with the electronic signature and the address of a service to which this token is to be transferred. The service to which the token is to be transferred is, for example, a service of a destination of the request transmitted in step S401.

In step S405, the mobile terminal 101 transmits a request that includes a token with an electronic signature to the address designated in step S404. The token with the electronic signature is included in a request as, for example, an argument of a parameter representing a token. In response to this request, the service that needs authentication is provided from the external server 121 to the mobile terminal 101.

The mobile terminal 101 may verify the validity of the token received in step S404 before transmitting the request in step S405. For example, the mobile terminal 101 may determine whether an IMSI and IMEI included in the token match its IMSI and IMEI or whether data (a query parameter, user data, or the like) included in the token and data included in the request received in step S403 match. If the mobile terminal 101 determines that the token is not valid, it does not transmit the request in step S405.

Figure 5:
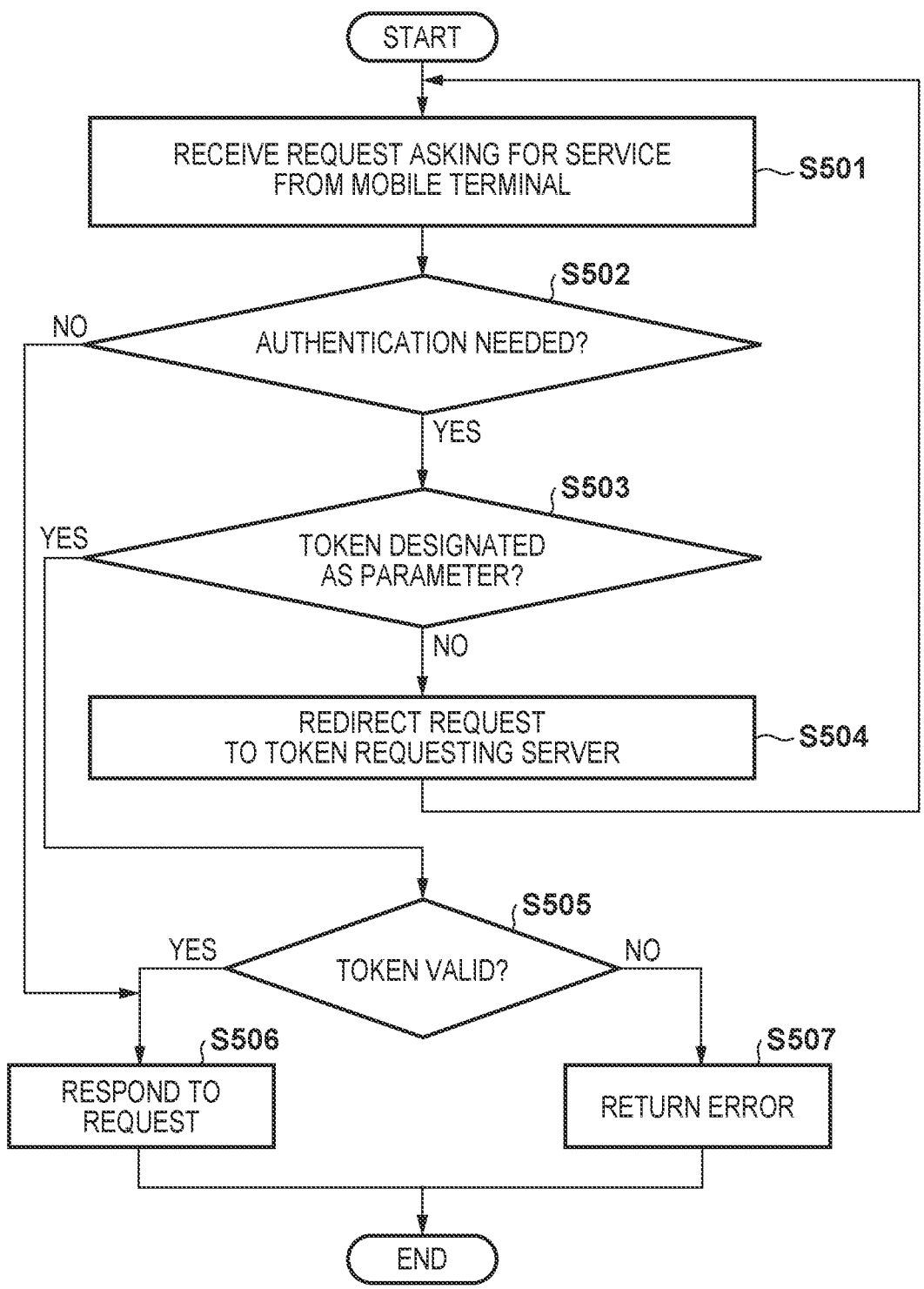
FIG. 5 is a flowchart for explaining an example of the operation of an external server in FIG. 1.

Next, the operation of the external server 121 will be described in detail with reference to FIG. 5. This operation may be implemented by causing the CPU 231 of the external server 121 to execute programs stored in the memory 232 as a general-purpose processing circuit. Instead of this, the external server 121 may include a dedicated processing circuit (for example, an ASIC) for executing each step below, and this circuit may execute each step.

In step S501, the external server 121 transmits a request asking for a service from the mobile terminal 101. This request is the same as described in step S401 above.

In step S502, the external server 121 determines whether the service requested in step S501 needs authentication of the user of the mobile terminal 101. The external server 121 advances the process to step S503 if the service needs authentication ("YES" in step S502) and advances the process to step S506 if the service does not need authentication ("NO" in step S502). In step S506, the external server 121 responds to the request from the mobile terminal 101 and provides the service to the mobile terminal 101.

In step S503, the external server 121 determines whether a token is designated as a parameter of the request received in step S501. The external server 121 advances the process to step S505 if the token is designated ("YES" in step S503) and advances the process to step S504 if the token is not designated ("NO" in step S503).

In step S504, the external server 121 redirects the request received in step S501 to the token requesting server 113. The address of the token requesting server 113 is stored, in advance, in the storage unit 234 of the external server 121 by an administrator of the external server 121. In step S504, the external server 121 may determine, for each service, whether authentication is performed by transferring the request to the token requesting server 113 or by another method. The external server 121 returns the process to step S501 after redirecting the request to the token requesting server 113 and waists for a further request from the mobile terminal 101.

In step S505, the external server 121 determines whether the token included in the request received in step S501 is valid. The external server 121 advances the process to step S506 if the token is valid ("YES" in step S505) and advances the process to step S507 if the token is not valid ("NO" in step S505).

The external server 121 determines that the token is not valid if the request does not include the token though the token is designated as the parameter.

If the request includes the token, the external server 121 determines the validity of the token. For example, the external server 121 verifies an electronic signature added to the token by a public key of the token issuing server 114 and determines whether the token has expired. Instead of this, the external server 121 may instruct the token issuing server 114 or another verification server to determine the validity of the token.

In step S506, if the token is valid, the external server 121 responds to the request assuming that authentication of the service requested in step S501 is complete and provides the service to the mobile terminal 101.

In step S507, if the token is not valid, the external server 121 responds to the request assuming that authentication of the service requested in step S501 fails and returns an error to the mobile terminal 101. For example, in the above-described scenario, the external server 121 returns "403 Forbidden" as an HTTP command.

Figure 6:
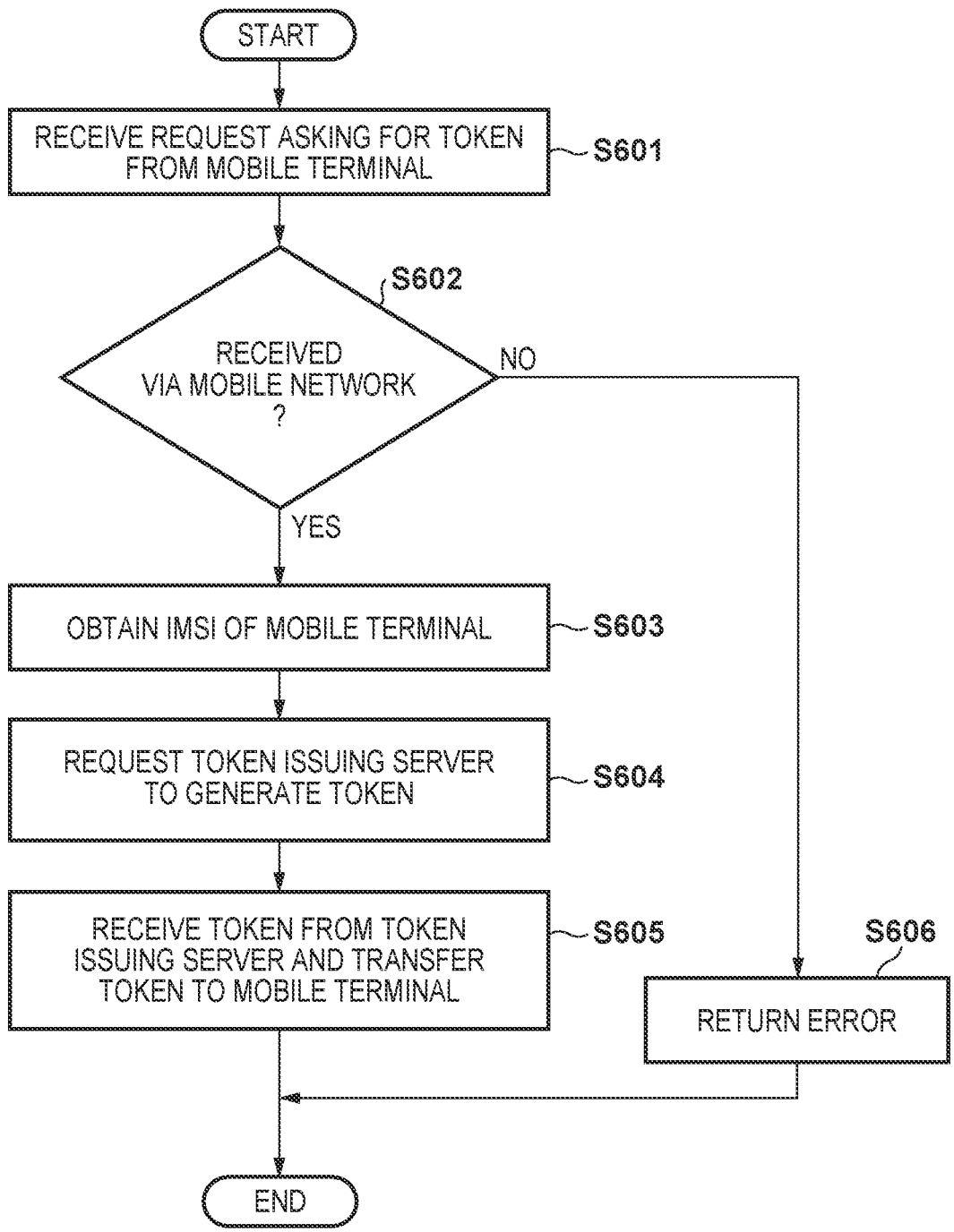
FIG. 6 is a flowchart for explaining an example of the operation of a token requesting server in FIG. 1.

Next, the operation of the token requesting server 113 will be described in detail with reference to FIG. 6. This operation may be implemented by causing the CPU 211 of the token requesting server 113 to execute programs stored in the memory 212 as a general-purpose processing circuit. Instead of this, the token requesting server 113 may include a dedicated processing circuit (for example, an ASIC) for executing each step below, and this circuit may execute each step.

In step S601, the token requesting server 113 receives a request asking for a token from the mobile terminal 101. This request is the same as described in step S403 above.

In step S602, the token requesting server 113 determines whether the request received in step S601 is received via the mobile network 110. The token requesting server 113 advances the process to step S603 if the request is received via the mobile network 110 ("YES" in step S602) and advances the process to step S606 if the request is received via another network ("NO" in step S602). The other network is, for example, the external network 120 such as the Internet.

The token requesting server 113 is connected to the gateway apparatus 112, and has an endpoint for communication in the mobile network 110 and an endpoint for communication with the external network 120. The token requesting server 113 is formed by two individual servers, and these two endpoints may be assigned to the two servers separately. If the mobile terminal 101 accesses the token requesting server 113 via the mobile network 110, the address ("https://auth.soracom.io" in the above-described scenario) of the token requesting server 113 undergoes name resolution to the endpoint for communication in the mobile network 110 by a domain name server. On the other hand, if the mobile terminal 101 accesses the token requesting server 113 via the external network 120 by using the wireless LAN or the like, the address of the token requesting server 113 undergoes name resolution to the endpoint for communication with the external network 120. By determining a specific endpoint at which the request arrives, the token requesting server 113 can determine whether the request received in step S601 is received via the mobile network 110.

Instead of having the above-described two endpoints, the token requesting server 113 may use, as an endpoint, one IP address at which both access via the mobile network 110 and access via the external network 120 arrive. In this case, the token requesting server 113 uses different network interfaces between the side of the mobile network 110 and the side of the external network 120, and based on a difference in network at which the request arrives, determines whether the request received in step S601 is received via the mobile network 110. More specifically, the token requesting server 113 determines, based on the arrival of the request at the network interface at which the access via the mobile network 110 arrives, that this request arrives via the mobile network 110 and determines, based on the arrival of the request at the other network interface at which the access via the external network 120 arrives, that this request arrives via the external network 120. The same IP address is assigned to these network interfaces. Even if the token requesting server 113 is formed by two individual servers, and these two endpoints are assigned to the two servers separately, the same control is implemented by assigning the different network interfaces between the side of the mobile network 110 and the side of the external network 120 while using the same IP address for the respective network interfaces.

The mobile network 110 can be regarded as a closed network, and thus a message (a request or a response) via the mobile network 110 may be a plaintext without being encrypted. This makes it possible to reduce power consumption or a processing capability required of the mobile terminal 101.

In step S606, if the request is received via the other network, the token requesting server 113 returns an error to the mobile terminal 101 and notifies the mobile terminal 101 that it cannot transmit the token. The token requesting server 113 explicitly returns the error to the mobile terminal 101 in this manner, allowing the mobile terminal 101 to continue the process without waiting for timeout or the like.

In step S603, if the request is received via the mobile network 110, the token requesting server 113 obtains the IMSI of the mobile terminal 101. For example, the token requesting server 113 can obtain the IMSI from session information between the mobile network 110 and the mobile terminal 101. The token requesting server 113 may return an error as in step S606 if it cannot obtain the IMSI, for example, if the mobile terminal 101 cannot receive a service by the mobile network 110. If the token requesting server 113 restricts access to a specific mobile terminal or a combination of a specific subscriber and mobile terminal, it may obtain the IMEI of the mobile terminal 101 from the session information and determine, based on this IMEI, whether the mobile terminal 101 can receive the service by the mobile network 110. This makes it possible to prevent an abuse when the SIM card 204 is stolen.

In step S604, the token requesting server 113 requests the token issuing server 114 to generate a token. This request includes the IMSI of the mobile terminal 101 obtained in step S603 and information included in the request from the mobile terminal 101 received in step S601 (a destination address, user data, or the like of the request transmitted in step S401). If the IMEI of the mobile terminal 101 is obtained in step S603, this request also includes this IMEI.

In step S605, the token requesting server 113 receives a token with an electronic signature from the token issuing server 114 and transfers this token to the mobile terminal 101.

Figure 7:
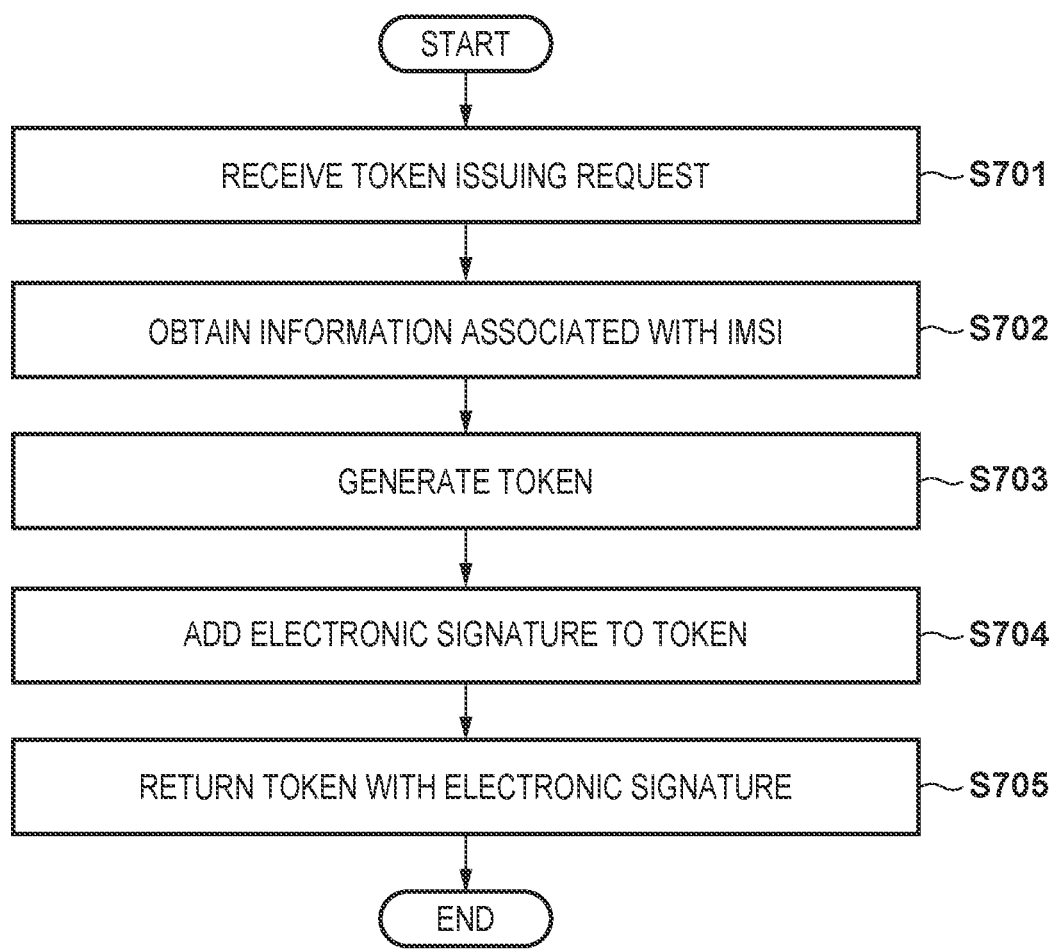
FIG. 7 is a flowchart for explaining an example of the operation of a token issuing server in FIG. 1.

Next, the operation of the token issuing server 114 will be described in detail with reference to FIG. 7. This operation may be implemented by causing the CPU 221 of the token issuing server 114 to execute programs stored in the memory 222 as a general-purpose processing circuit. Instead of this, the token issuing server 114 may include a dedicated processing circuit (for example, an ASIC) for executing each step below, and this circuit may execute each step.

In step S701, the token issuing server 114 receives a request asking for a token from the token requesting server 113. This request is the same as described in step S604 above.

In step S702, the token issuing server 114 obtains information associated with an IMSI included in the request received in step S701. This information includes a user profile (for example, the name, address, e-mail address, and the like of the user) of the mobile terminal 101. This information is stored, in advance, in the storage unit 224 of the token issuing server 114. Instead of this, the user profile may be stored in a database outside the token issuing server 114, or the token issuing server 114 may read out the user profile from this database by using the IMSI as a key.

In step S703, the token issuing server 114 generates a token. This token includes the IMSI which is included in the request received in step S701, the information obtained in step S702, an expiration date of the token set by the token issuing server 114, and information (user data, a query parameter, or the like) concerning the request to the external server 121 which is included in the request received in step S701.

In step S704, the token issuing server 114 adds an electronic signature to the token generated in step S703 by using a private key of the token issuing server 114. The target of the electronic signature may be the whole token or a part of it. The private key of the token issuing server 114 is stored, in advance, in the storage unit 224 of the token issuing server 114.

In step S704, the token issuing server 114 returns the token to which the electronic signature is added in step S704 to the token requesting server 113.

According to the embodiment described above, a secure authentication result of an SIM can also be used for authentication in the external server 121. In the above-described embodiment, if a request from the mobile terminal 101 is received via a network other than the mobile network 110, the token requesting server 113 returns an error. Instead of this, the token requesting server 113 may authenticate the mobile terminal 101 by a method different from obtainment of the IMSI using the session with the mobile terminal 101 described above (step S603) and obtain this IMSI. For example, the token requesting server 113 may authenticate the mobile terminal 101 via the external network 120 by using a challenge/response according to an EAP (Extensible Authentication Protocol) and obtain this IMSI. This method is applicable not only to a case in which the request is received via the network other than the mobile network 110 but also to a case in which the request is received via the mobile network 110.

In the above-described embodiment, an authentication result using the SIM card 204 of the mobile terminal 101 is also used for authentication in the external server 121. Thus, another device that accesses the external server 121 via the mobile terminal 101 by using tethering or the like can also use the authentication result of the mobile terminal 101. If the user of the mobile terminal 101 wants to prevent such use by the other device, the token requesting server 113 and the mobile terminal 101 may be set so as to prevent routing by the mobile terminal 101. For example, a link local address (169.254.0.0/16 in IPv4 and fe80::/10 in IPv6) may be set as the endpoint for communication in the mobile network 110 of the token requesting server 113. In this case, the token requesting server 113 and the mobile terminal 101 are linked directly, making it possible to allow the mobile terminal 101 to reach the token requesting server 113 by the link local address. On the other hand, the other device passing through the mobile terminal 101 is linked to the token requesting server 113 indirectly, making it impossible to allow the mobile terminal 101 to reach the token requesting server 113.

Subsequently, an example of another operation of the mobile communication system in FIG. 1 will be described. As described above, a token provided to the external server 121 includes a user profile. Therefore, the user of the mobile terminal 101 may provide his/her own personal information to the external server 121 by using the above-described mobile communication system.

First, the user of the mobile terminal 101 registers his/her own private information in the token issuing server 114 in association with the IMSI of the mobile terminal 101. That is, an administrator of the token issuing server 114 serves as a personal information administrator. The personal information administrator may perform identity verification of the user of the mobile terminal 101 by using an identification card or the like. On the other hand, the administrator of the external server 121 applies to the personal information administrator for use of the personal information. The personal information administrator may confirm the presence of the administrator of the external server 121 or may confirm an office physically. Furthermore, the personal information administrator may monitor the administrator of the external server 121 periodically and exclude an inappropriate administrator from a service recipient.

Figure 8:
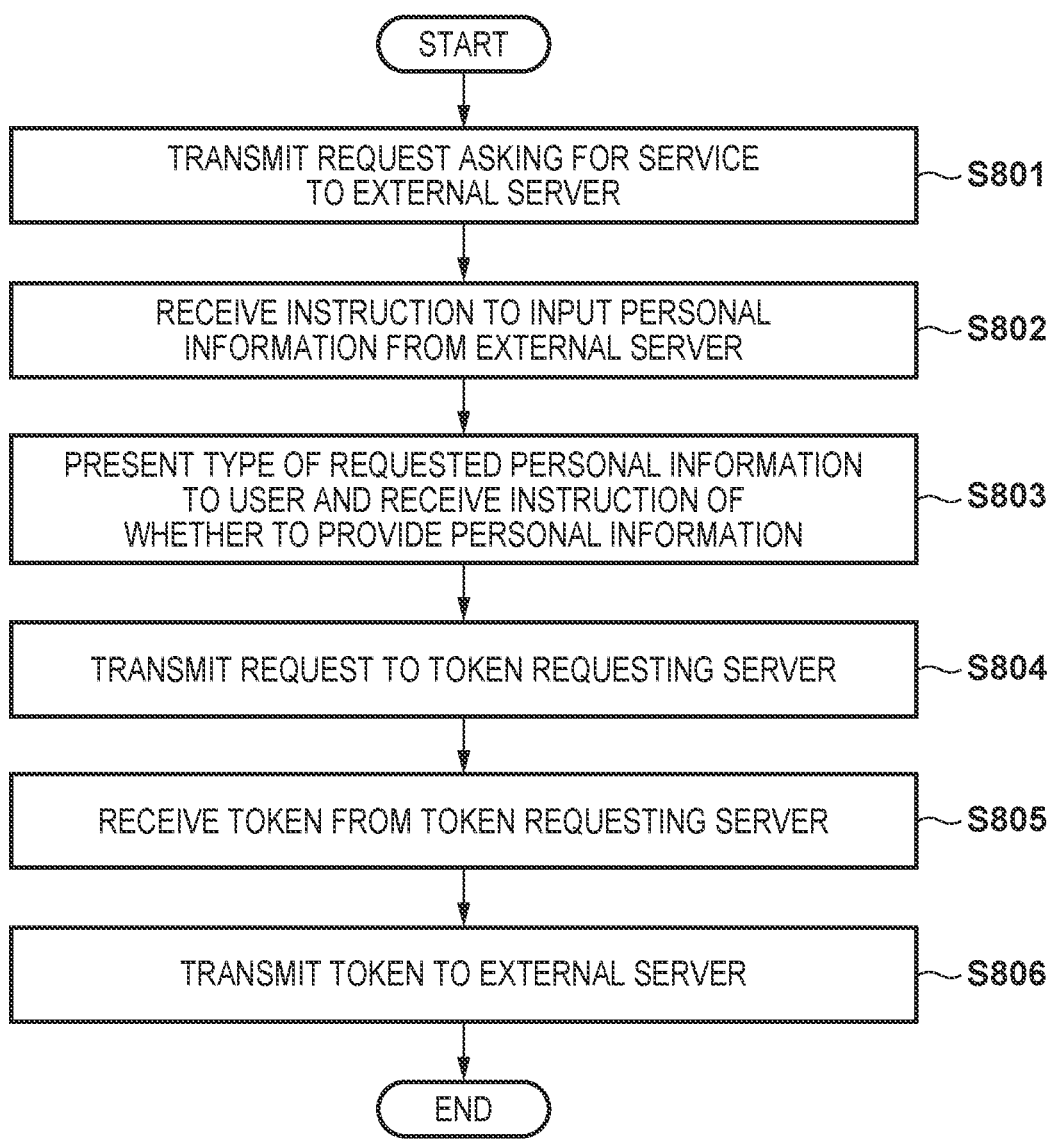
FIG. 8 is a flowchart for explaining an example of another operation of the mobile terminal in FIG. 1.

The operation of the mobile terminal 101 will be described in detail with reference to FIG. 8. This operation may be implemented by causing the CPU 201 of the mobile terminal 101 to execute programs stored in the memory 202 as a general-purpose processing circuit. Instead of this, the mobile terminal 101 may include a dedicated processing circuit (for example, an ASIC) for executing each step below, and this circuit may execute each step.

In step S801, the mobile terminal 101 transmits a request asking for a service to the external server 121. This service may or may not need personal information. This service may be web page browsing as in the above-described scenario, or a service using a protocol other than the HTTP, for example, transmission/reception of a mail, file transfer, or the like. If the service of the external server 121 does not need the personal information, the mobile terminal 101 is provided with the service from the external server 121 and terminates the process. A case in which the service of the external server 121 needs the personal information will be discussed below.

In step S802, the mobile terminal 101 receives an instruction to input the personal information from the external server 121. This input instruction includes the type of necessary personal information (for example, a name, an address, a telephone number, a credit card number, or the like).

In step S803, the mobile terminal 101 displays, on the display 205, the type of personal information to which the input instruction is given and receives an instruction of whether to provide the personal information from the user by using the input device 206. The mobile terminal 101 terminates the process if instructed not to provide the personal information and continues the process if instructed to provide the personal information.

In step S804, the mobile terminal 101 transmits a request to the token requesting server 113. In this embodiment as well, as described above, the request to the token requesting server 113 is treated as a request asking for a token with an electronic signature regardless of the presence/absence of an explicit instruction in this request. The request to the token requesting server 113 includes a destination address (for example, the URL) of the request transmitted in step S801. Furthermore, the request to the token requesting server 113 includes the type of necessary personal information received in step S802.

In response to the request transmitted in step S804, the token requesting server 113 returns the token with the electronic signature to the mobile terminal 101 by performing the process described with reference to FIG. 6. This token includes personal information of the user of the mobile terminal 101 as a user profile. The token requesting server 113 returns an error to the mobile terminal 101 unless an address of the external server 121 included in the request is an address of the external server 121 whose application for use is accepted. This makes it possible to prevent the personal information of the user from being provided to the unreliable external server 121.

In step S805, the mobile terminal 101 receives the token from the token requesting server 113. In step S806, the mobile terminal 101 transmits the token to the external server 121.

Next, the operation of the external server 121 will be described in detail with reference to FIG. 9. This operation may be implemented by causing the CPU 231 of the external server 121 to execute programs stored in the memory 232 as a general-purpose processing circuit. Instead of this, the external server 121 may include a dedicated processing circuit (for example, an ASIC) for executing each step below, and this circuit may execute each step.

In step S901, the external server 121 transmits a request asking for a service from the mobile terminal 101. This request is the same as described in step S801 above.

In step S902, the external server 121 determines whether the service requested in step S901 needs the personal information of the user of the mobile terminal 101. The external server 121 advances the process to step S903 if the service needs the personal information ("YES" in step S902) and advances the process to step S906 if the service does not need the personal information ("NO" in step S902). In step S906, the external server 121 responds to the request from the mobile terminal 101 and provides the service to the mobile terminal 101. As the service that needs the personal information, there is, for example, the dispatch of goods (which needs a name, an address, a telephone number, and the like) or account settlement processing (which needs a name, a credit card number, and the like).

In step S903, the external server 121 requires the mobile terminal 101 to input the personal information needed to provide the service. In step S904, the external server 121 receives a token form the mobile terminal 101.

In step S905, the external server 121 determines whether the token received in step S904 is valid. The external server 121 advances the process to step S906 if the token is valid ("YES" in step S905) and advances the process to step S907 if the token is not valid ("NO" in step S905). The validity of the token is determined as in step S505.

In step S906, if the token is valid, the external server 121 provides the service to the mobile terminal 101 by using the personal information included in the token. The external server 121 may obtain the personal information of the user of the mobile terminal 101 from the token issuing server 114 instead of obtaining the personal information from the token. In this case, the token includes only the type of personal information needed by the external server 121 and may not include the contents of the personal information. The external server 121 may transmit the token received in step S904 to the token issuing server 114 in order to obtain the personal information from the token issuing server 114. The token issuing server 114 provides the personal information to the external server 121 if the token received form the external server 121 is a token issued by itself. In step S907, if the token is not valid, the external server 121 responds to the request assuming that the personal information is not input and returns the error to the mobile terminal 101.

In the above-described embodiment, the user of the mobile terminal 101 can provide his/her own personal information to the reliable external server 121 in a necessary range and can unitarily manage his/her own personal information in the token issuing server 114. Further, the administrator of the external server 121 need not manage the personal information of the user of the mobile terminal 101, reducing a risk such as a leak accident. Furthermore, the administrator of the external server 121 can identify that the obtained personal information is valid (at least information is managed by the personal information administrator).

The present invention is not limited to the above-described embodiments, and various changes and modifications can be made within the spirit and scope of the present invention. Therefore, to apprise the public of the scope of the present invention, the following claims are made.

The invention claimed is:

1. A server arranged in a mobile network for providing a token to a mobile terminal, the server comprising:

a network interface; and a processor coupled to the network interface, a memory comprising instructions executable by the processor, wherein, when executed, the instructions cause the processor to at least:

receive, from the mobile terminal, a first request asking for the token, the first request including an address of an external server, the mobile terminal having attempted to send a request for a web page to the address of the external server, and the server receives the first request from the mobile terminal after the mobile device is redirected by the external server to an address associated with the server, determine whether the first request is received via the mobile network, if the first request is received via the mobile network, obtain subscriber identification information of the mobile terminal based on a session with the mobile terminal, send a second request to a token issuing server to obtain the token, the second request including the subscriber identification information of the mobile terminal and the address of the external server included in the first request received from the mobile terminal, and receive, from the token issuing server, the token generated by the token issuing server in response to the second request, where an electronic signature is added to the token;

transmit, to the mobile terminal, the token returned from the token issuing server, and if the first request is received via a network other than the mobile network, notify the mobile terminal that the token is not transmitted.

2. The server according to claim 1, wherein the server includes a first network interface at which access via the mobile network arrives and a second network interface at which access via a network other than the mobile network arrives, and when executed, the instructions further cause the processor to at least: determine, based on an arrival of the first request at the first network interface, that the first request is received via the mobile network.

3. The server according to claim 1, wherein, when executed, the instructions further cause the processor to at least:

obtain apparatus identification information of the mobile terminal, and not transmit the token to the mobile terminal if the apparatus identification information does not correspond to the subscriber identification information.

4. The server according to claim 1, wherein a link local address is assigned to the network interface.

5. The server according to claim 1, wherein the token includes a query parameter included in the first request received from the mobile terminal.

6. A server arranged in a mobile network for providing a token to a mobile terminal, the server comprising:
a network interface; and
a processor coupled to the network interface, and
a memory comprising instructions executable by the processor, wherein, when executed, the instructions cause the processor to at least:
receive, from the mobile terminal, a first request asking for the token, the first request including an address of an external server, the mobile terminal having attempted to send a request for a web page to the address of the external server, and the server receives the first request from the mobile terminal after the mobile device is redirected by the external server to an address associated with the server,
determine whether the first request is received via the mobile network,
obtain subscriber identification information of the mobile terminal based on a session with the mobile terminal if the first request is received via the mobile network,
obtain the subscriber identification information by performing authentication processing on the mobile terminal if the first request is received via a network other than the mobile network,
send a second request to a token issuing server to obtain the token, the second request including the subscriber identification information of the mobile terminal and the address of the external server included in the first request received from the mobile terminal, and
receive, from the token issuing server, the token generated by the token issuing server in response to the second request, where an electronic signature is added to the token;
transmit, to the mobile terminal, the token returned from the token issuing server.

7. A program stored in a non-transitory storage medium, wherein, when executed by a processor in a server comprising a network interface for connecting a mobile network, the program causes the processor to:
receive, from a mobile terminal, a first request asking for a token, the first request including an address of an external server, the mobile terminal having attempted to send a request for a web page to the address of the external server, and the server receives the first request from the mobile terminal after the mobile device is redirected by the external server to an address associated with the server;
determine whether the first request is received via the mobile network;
if the first request is received via the mobile network,
obtain subscriber identification information of the mobile terminal based on a session with the mobile terminal,
send a second request to a token issuing server to obtain the token, the second request including the subscriber identification information of the mobile terminal and the address of the external server included in the first request received from the mobile terminal;
receive, from the token issuing server, the token generated by the token issuing server in response to the second request, where an electronic signature is added to the token; and
transmit, to the mobile terminal, the token returned from the token issuing server, and
if the first request is received via a network other than the mobile network, notify the mobile terminal that the token is not transmitted.

8. A program stored in a non-transitory storage medium, wherein, when executed by a processor in a server comprising a network interface for connecting a mobile network, the program causes the processor to:
receive, from a mobile terminal, a first request asking for a token, the first request including an address of an external server, the mobile terminal having attempted to send a request for a web page to the address of the external server, and the server receives the first request from the mobile terminal after the mobile device is redirected by the external server to an address associated with the server,
determine whether the first request is received via the mobile network,
obtain subscriber identification information of the mobile terminal based on a session with the mobile terminal if the first request is received via the mobile network,
obtain the subscriber identification information by performing authentication processing on the mobile terminal if the first request is received via a network other than the mobile network,
send a second request to a token issuing server to obtain the token, the second request including the subscriber identification information of the mobile terminal and the address of the external server included in the first request received from the mobile terminal,
receive, from the token issuing server, the token generated by the token issuing server in response to the second request, where an electronic signature is added to the token, and
transmit, to the mobile terminal, the token returned from the token issuing server.

* * * * *